United States Patent [19]

Suzuki et al.

[11] Patent Number: 5,030,265
[45] Date of Patent: Jul. 9, 1991

[54] OPTICAL FIBER COUPLER MANUFACTURING DEVICE

[75] Inventors: Fumio Suzuki, Sanbu; Noboru Kawakami; Yoshio Kikuchi, both of Chiba; Ryozo Yamauchi, Sakura, all of Japan

[73] Assignee: Fujikura Ltd., Tokyo, Japan

[21] Appl. No.: 516,500

[22] Filed: May 1, 1990

[30] Foreign Application Priority Data

May 9, 1989 [JP] Japan ................... 1-115529
Feb. 27, 1990 [JP] Japan ................... 2-46695

[51] Int. Cl.$^5$ ............................. C03B 37/15
[52] U.S. Cl. ......................... 65/4.2; 65/4.3; 65/29; 65/158; 350/96.15
[58] Field of Search ............. 65/29, 3.11, 4.2, 4.21, 65/4.3, 11.1, 12, 158; 350/396.15, 396.33

[56] References Cited

U.S. PATENT DOCUMENTS

| 4,668,264 | 5/1987 | Dyott | 65/3.11 |
| 4,763,272 | 8/1988 | McLandrich | 65/4.2 X |
| 4,765,816 | 8/1988 | Bjornlie et al. | 65/4.2 |
| 4,798,436 | 1/1989 | Mortimore | 350/96.15 |
| 4,895,423 | 1/1990 | Bilodeau et al. | 350/96.15 |

FOREIGN PATENT DOCUMENTS

| 8803660 | 5/1988 | Australia . | |
| 0234326 | 1/1987 | European Pat. Off. . | |
| 0366110 | 10/1989 | European Pat. Off. . | |
| 3733138 | 4/1989 | Fed. Rep. of Germany . | |
| 2204145 | 2/1988 | United Kingdom . | |

Primary Examiner—Robert L. Lindsay

[57] ABSTRACT

A optical fiber coupler manufacturing device is disclosed for the manufacture of fused-elongated type optical fiber couplers. The disclosed invention provides an optical fiber coupler manufacturing device having a chassis, a pair of movable stands provided within the chassis forming a space therebetween, optical fiber mounting units for mounting and fixing two or more component optical fibers on the above mentioned pair of movable stands, and a drive mechanism whereby the pair of movable stands can be driven back and forth in a direction parallel to the longitudinal axes of the component optical fibers. By virtue of the space formed between the two movable stands, a heat source can be applied to the aligned portions of the component optical fibers, thereby effecting thermal fusing of the aligned portions, after which drawing out of the thus fused section can be effected using the above mentioned drive mechanism for the movable stands, and additionally, a protective case for surrounding and reinforcing the manufactured optical fiber coupler can easily be applied without removing the optical fiber coupler from the apparatus through the above described space.

18 Claims, 7 Drawing Sheets

OPTICAL FIBER COUPLER MANUFACTURING DEVICE

BACKGROUND OF THE INVENTION

1. Field of the Invention

The present invention relates to equipment for the manufacture of optical fiber couplers used in communication systems and for optical sensors, etc., and in particular, relates to equipment for the manufacture of fused-elongated type optical fiber couplers.

2. Prior Art

Figure 9:
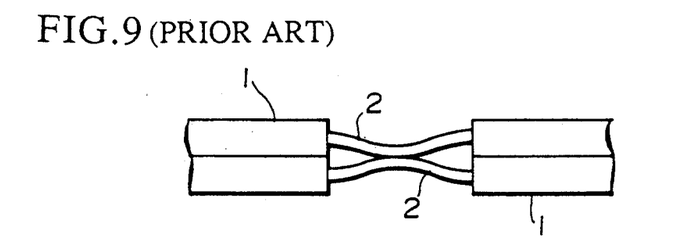
FIGS. 9 through 12 are explanatory diagrams illustrating the steps of a conventional method for manufacturing fused-elongated type optical fiber couplers.
Figure 10:
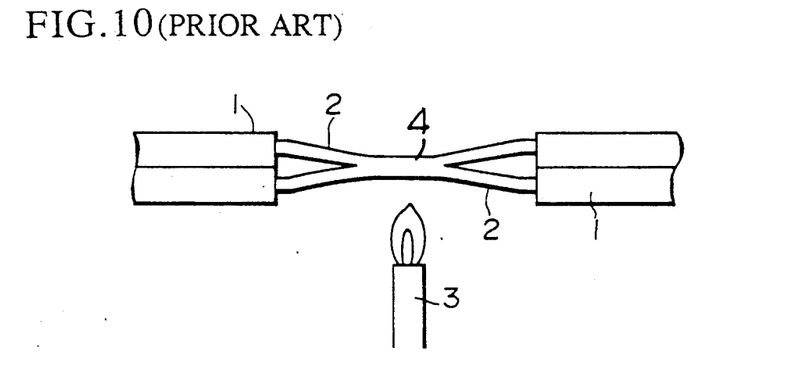

Optical fiber couplers formed from a fused-elongated region are well known in the art, and conventional methods for their manufacture have been described, for example as is shown in FIGS. 9 to 12. Referring to these drawings, first of all as shown in FIG. 9, a portion of two component optical fibers 1 from which the protective coating has been removed thereby exposing the clad 2 are aligned in contact side by side and fixed in this configuration using an adhesive agent. Next, the thus joined sections of exposed clad 2 of the component optical fibers are fused by heating with an oxygen-hydrogen flame 3 or similar high temperature heating apparatus, and the fused section is then drawn out, thereby forming the fused-elongated region 4 as is shown in FIG. 10.

Figure 11:
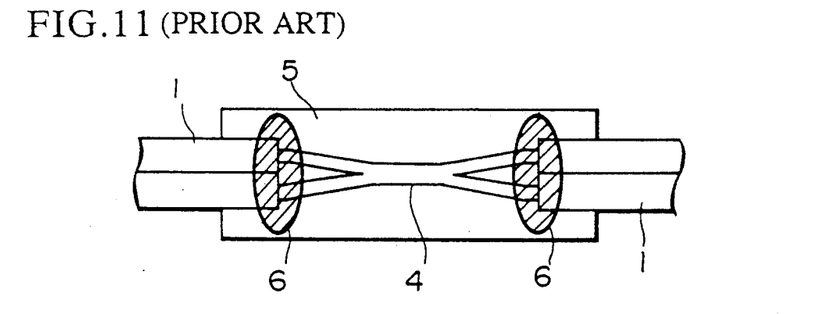
Figure 12:
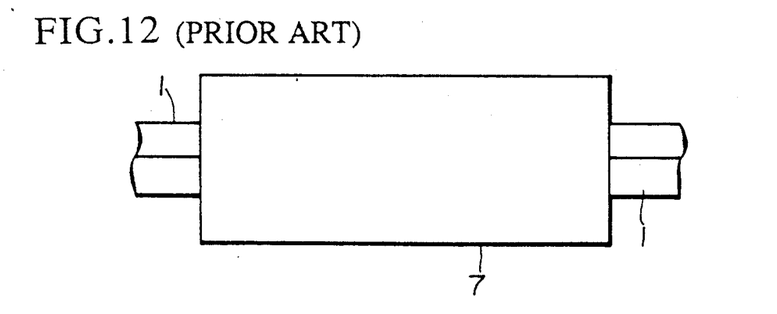

With the kind of optical fiber coupler formed as described above, ordinarily the fused-elongated region 4 is fixed to a reinforcing plate 5 made of metal, glass, or the like using an adhesive agent 6, as shown in FIG. 11. Finally, the optical fiber coupler and the plate to which it is attached is usually placed in and covered by a section of metal pipe as shown in FIG. 12, whereby the coupler is mechanically reinforced and protected.

Figure 13:
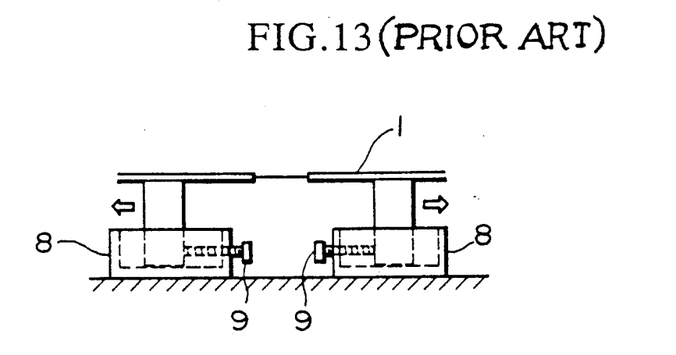
FIGS. 13 and 14 are diagrams illustrating a conventional apparatus for manufacturing fused-elongated type optical fiber couplers.
Figure 14:
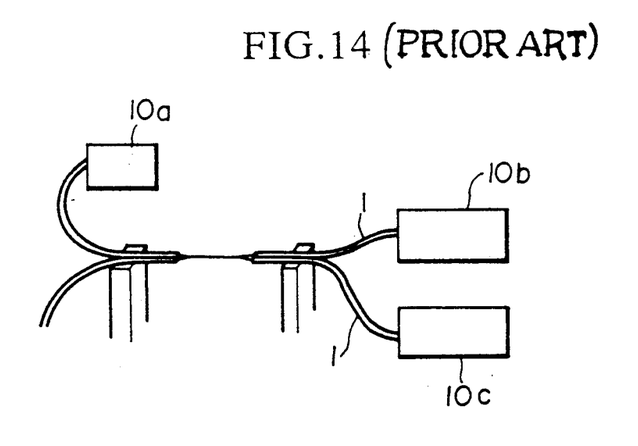

For the above described drawing out of the fused section of component optical fibers 1, as shown in FIG. 13, a pair of extender stands 8 may be used, the linear movement of which can be effected and controlled using respective screw mechanisms. During the manufacture of this type of fused-elongated type optical fiber coupler, it is essential that the extent of elongation be accurately controlled during the drawing out process. For this reason, a light source 10a is provided at one end of one of the component optical fibers 1, while light power meters 10b, 10c or similar devices for measuring light intensity are provided at the opposite end of both component optical fibers 1 as shown in FIG. 14, whereby the coupling ratio for the fused-elongated region 4 under formation can be determined while the fused region is drawn out, thus permitting highly accurate control of the coupling ratio of the optical fiber coupler that is produced.

However, with the above described conventional manufacturing method for fused-elongated type optical fiber couplers, the following problems exist:

1. In the method as described, separate left and right extender stands were employed, the movement of which is independent of one another. For this reason, it is very difficult to manufacture a fused-elongated type optical fiber coupler having symmetrically formed right and left halves.
2. The manufacturing method described above requires two or more individual devices and is thus prone to be cumbersome. Further, the various devices required are likely to occupy a relatively large work space.
3. Furthermore, by employing a separate light source and light power meters in addition to the left and right extender stands, not only are the problems described in 2 above aggravated but further, it is often the case that additional length is required for the component optical fibers extending from the optical fiber coupler to the light source and light power meters.

SUMMARY OF THE INVENTION

In consideration of the above shortcomings in connection with conventional methods for the manufacture of fused-elongated type optical fiber couplers, it is an object of the present invention to provide a compact optical fiber coupler manufacturing device whereby high quality optical fiber couplers can be easily manufactured.

As the result of various experiments, it has been found that by providing a optical fiber coupler manufacturing device with a pair of internal movable stands wherein two or more component optical fibers are mounted, and a drive mechanism whereby the movable stands may be driven in a direction parallel to the longitudinal axes of the component optical fibers, that it is possible to easily and reliably manufacture high quality fused-elongated type optical fiber couplers, and that an apparatus so constructed can have a compact size.

Accordingly, the present invention provides an optical fiber coupler manufacturing device having a chassis, a pair of movable stands provided within the chassis forming a space therebetween, optical fiber mounting units for mounting and fixing two or more component optical fibers on the above mentioned pair of movable stands, and a drive mechanism whereby the pair of movable stands can be driven back and forth in a direction parallel to the longitudinal axes of the component optical fibers.

By employing an apparatus so comprised, when two or more component optical fibers are mounted on the above mentioned pair of movable stands and aligned side by side therebetween, by virtue of the space formed between the two movable stands, a heat source can be applied to the aligned portions of the component optical fibers, thereby effecting thermal fusing of the aligned portions, after which drawing out of the thus fused section can be effected using the above mentioned drive mechanism for the movable stands. Thus, in this way, it is possible to manufacture high quality fused-elongated type optical fiber couplers easily and reliably, using a compact apparatus.

Further, by virtue of the above mentioned space formed between the two movable stands, in addition to the above described fusing operation, a protective case for surrounding and reinforcing the optical fiber coupler thus formed can easily be applied without removing the formed optical fiber coupler from the apparatus. Thus, using the optical fiber coupler manufacturing device, the entire manufacturing process can be easily and reliably be carried out using a unitary and compact apparatus, thus considerably improving the efficiency of the manufacturing process.

DETAILED DESCRIPTION OF THE PREFERRED EMBODIMENTS

First Preferred Embodiment

In the following sections, the preferred embodiments of the present invention will be described in detail. First of all, a first preferred embodiment will be described with reference to FIGS. 1 to 6.

Figure 1:
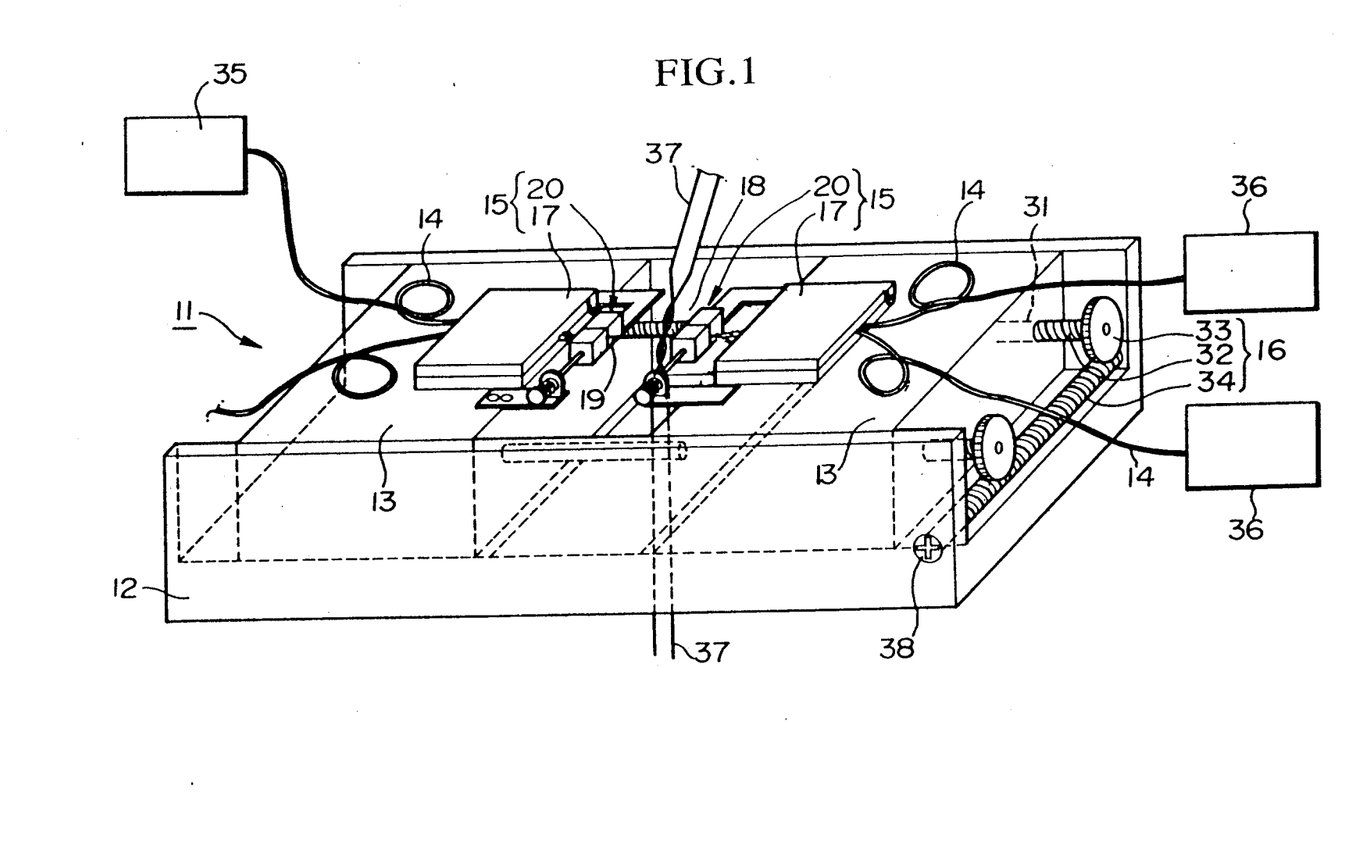
FIG. 1 is an oblique view of the optical fiber coupler manufacturing apparatus of a first preferred embodiment of the present invention.

In FIG. 1, an oblique view of the optical fiber coupler manufacturing device 11 of this first embodiment is shown. Referring to the drawing, it can be seen that the manufacturing device 11 of the present embodiment includes a chassis 12, a pair of movable stands 13 moveably provided within the chassis 12, a pair of optical fiber supports 15 wherein two or more optical fibers 14 can be fixed on the movable stands 13, and a linear drive mechanism 16 whereby the two or more optical fibers 14 supported on movable stands 13 can be moved back and forth along the direction of their longitudinal axes.

The above mentioned chassis 12 forms a vertical concavity and functions as a frame wherein the two movable stands 13 are received, having a sufficient length so that the two movable stands 13 can travel over a fixed distance within the vertical concavity formed therein.

The above mentioned movable stands 13 which are enclosed within the chassis 12 have a square shape and one of the above mentioned optical fiber supports 15 is mounted on the upper surface of each of the two movable stands 13.

Figure 2:
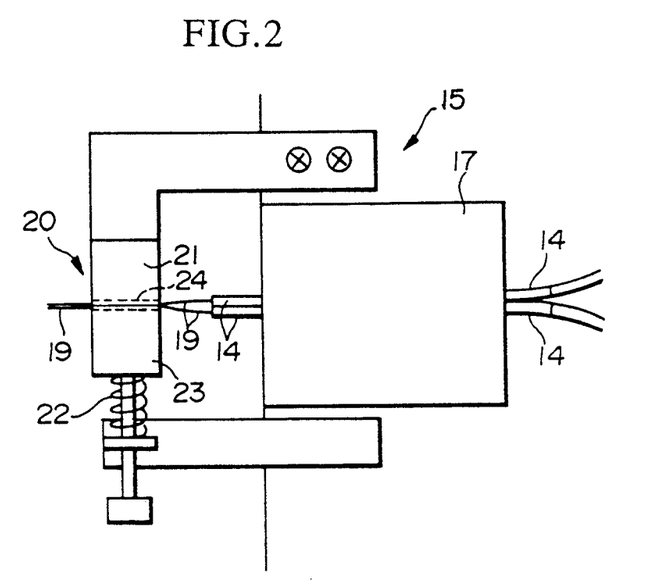
FIG. 2 is an overhead view of an optical fiber support employed in the optical fiber coupler manufacturing apparatus of the first preferred embodiment of the present invention.

As shown in FIG. 2, each of the above mentioned optical fiber supports 15 is formed from a mounting unit 17 wherein the two or more optical fibers 14 are clasped and supported, and an alignment unit 20 projecting into the space 18 formed between the two movable stands 13. By means of the above mentioned alignment units 20, the exposed portion 19 of each optical fiber 14 from which the protective coating has been removed is aligned within the space 18 between the two movable stands 13.

Figure 3:
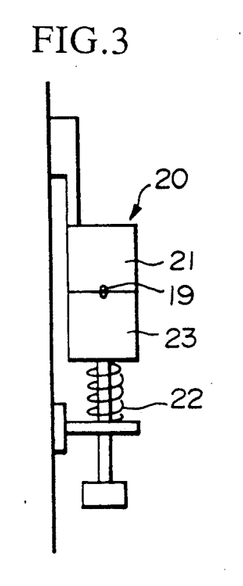
FIGS. 3 and 4 are overhead views illustrating the function of an alignment unit employed in the optical fiber coupler manufacturing apparatus of the first preferred embodiment of the present invention.
Figure 4:
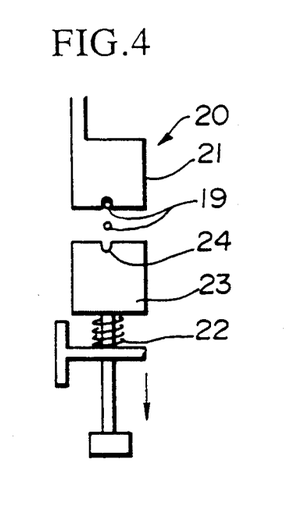

As shown in FIG. 3, each of the above mentioned alignment units 20 is made up of a fixed side support piece 21 and a movable side support piece 23 which is pushed against the corresponding fixed side support piece 21 by a corresponding spring 22. A groove 24 is formed in each of the contacting surfaces of the above mentioned fixed side support piece 21 and movable side support piece 23, in which the exposed portions 19 of the two or more optical fibers 14 are inserted. As shown in FIG. 4, when the movable side support piece 23 is pulled in the direction of the arrow, a space opens between fixed side support piece 21 and movable side support piece 23 so that the exposed portions 19 of the two or more optical fibers 14 may be inserted in the above described grooves 24. When the movable side support piece 23 is then released, the spring 22 causes the contacting surfaces of the fixed side support piece 21 and movable side support piece 23 to come together again, whereby the exposed portions 19 of the two or more optical fibers 14 are clasped and supported in alignment.

Figure 5:
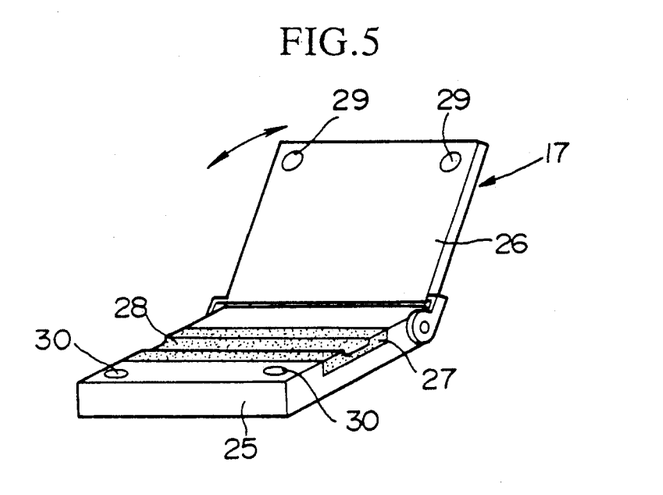
FIGS. 5 and 6 are oblique views illustrating the function of a mounting unit 17 employed in the optical fiber coupler manufacturing apparatus of the first preferred embodiment of the present invention.
Figure 6:
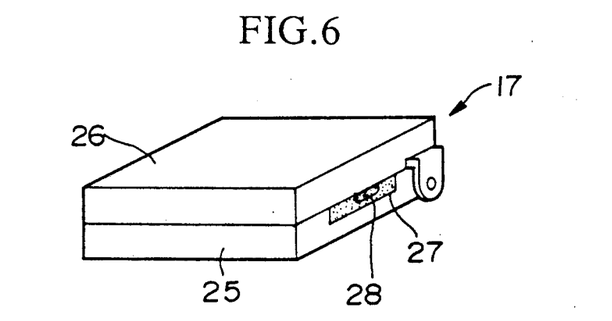

As shown in FIGS. 5 and 6, each of the above mentioned mounting units 17 is comprised of a base 25 and a cover 26 mounted thereon so as to open and close freely by pivoting. The upper surface of each base 25 which comes into contact with the cover 26 when it is closed is provided with a gripping section 27 made of rubber, composite resin, or some similar substance which will not injure the surface of the two or more optical fibers 14 held therein and which is capable of applying a large friction force. Formed in the above mentioned gripping section 27 is a widened groove 28 within which the two or more optical fibers 14 are inserted and held in alignment, the portion of the two or more optical fibers 14 held therein still retaining their protective coating. For each of the above mentioned mounting units 17, either the base 25 or cover 26 has a pair of magnets 29. The opposite half of the mounting unit 17, that is, either the base 25 or cover 26 has a pair of metallic pieces 30 made of iron, steel, or some other ferrous material, each of which corresponds to one of the magnets in the other half. The magnets 30 have sufficient strength so that the cover 29 is held secure when closed and does not open unexpectedly.

The above mentioned linear drive mechanism 16 includes a pair of screw rods 32 oriented horizontally and running parallel to the longitudinal axis of chassis 12. In each of the movable stands 13, a pair of threaded holes 31 are formed, through each of which one of the above described screw rods 32 passes, the threads of the screw rods 32 engaging with the threads of the threaded holes 31. At one end of each of the screw rods 32, a gear 33 is provided, each gear 33 engaging with screw shaft 34 which is provided in a horizontal orientation and perpendicular to the above mentioned screw rods 32.

The threads of each of the above described screw rods 32 reverse direction midshaft and the threaded holes 31 of movable stands 13 are threaded in such a way so that when the screw rods 32 are driven in one direction by rotation of screw shaft 34 via respective gears 33, the pair of movable stands 13 move apart, and when the screw rods 32 are driven in the opposite direction, the pair of movable stands 13 approach one another.

When fabricating an optical fiber coupler using the above described optical fiber coupler manufacturing device 11, first of all, a pair of optical fibers 14 from a portion of each of which the protective coating has been removed are mounted in the optical fiber supports 15, whereby the exposed portions 19 of the two component optical fibers 14 are aligned side by side in the space formed between the two movable stands 13. One end of one of the optical fibers 14 is connected with a light source 35, whereby a laser beam is caused to be incident on the end of the optical fiber 14. The opposite end of each optical fibers 14 is connected with a respective light power meter 36, whereby the coupling ratio between the two component optical fibers 14 can be measured.

Next, as shown in FIG. 1, an oxygen hydrogen burner 37 is introduced into the space 18 formed between the two movable stands 13, and the exposed portions 19 of the two optical fibers 14 are heated and mutually fused. For the above described heating and fusing of the exposed portions 19 of the two optical fibers 14, the heating means is not limited to a oxygen-hydrogen burner 37. Thus for the heating and fusing process, an electrical discharge heating apparatus, electric heating apparatus, and other types of heating apparatuses may be utilized as well.

Next, a drive device which is connected with an end 38 of the screw shaft 34 is activated, whereby the screw shaft 34 is caused to rotate, which in turn causes the two screw rods 32 to rotate together in the same direction via the gears 33, whereby the two movable stands 13 are caused to move apart, thereby drawing out the heated, fused section of the exposed portions 19 of the two optical fibers 14. The above described drawing out is carried out while the coupling ratio is determined based the light output measured by the two light power meters 36. Accordingly, when the object coupling ratio is obtained, the movement of the movable stands 13 is stopped.

In the present embodiment, an electric motor has been employed for the drive device which engages with the end 38 of screw shaft 34, thereby driving the linear drive mechanism 16. This invention is not so limited, however, and it is also possible to employ, for example, a knob whereby linear drive mechanism 16 can be driven by hand. Additionally, it is possible to form the end 38 of screw shaft 34 so as to be engagable with a screw driver. Thus, using a screw driver instead of the above mentioned knob linear drive mechanism 16 can be driven by hand.

With the fused-elongated type optical fiber coupler manufactured by the above described process, when it is desirable to encase and mechanically reinforce the manufactured coupler, a reinforcement plate may be added through the space 18 between the two movable stands 13, attaching the optical fiber coupler thereto using adhesive agents or the like, after which the coupler and plate may then be inserted in a metal pipe to provide further protection.

With the optical fiber coupler manufacturing device 11 as described above, it is possible to manufacture a high quality fused-elongated type optical fiber coupler which is exceedingly uniform and symmetrical. By employing such a unitary apparatus for the entire manufacturing process, it is possible to consistently manufacture high quality optical fiber couplers by a simple series of steps, thus improving efficiency and manufacturing uniformity. Furthermore, the optical fiber coupler manufacturing apparatus 11 of the present preferred embodiment is applicable, as desired, to miniaturization.

Moreover, because the optical fiber coupler manufacturing device 11 of the present preferred embodiment provides a central opening in the form of space 18, reinforcement plates, protective encasing, and similar auxiliary enhancements may be readily added after the fusing elongation process has been carried out.

Second Preferred Embodiment

In the following section, a second preferred embodiment of the present invention will be described with reference to FIG. 7.

Figure 7:
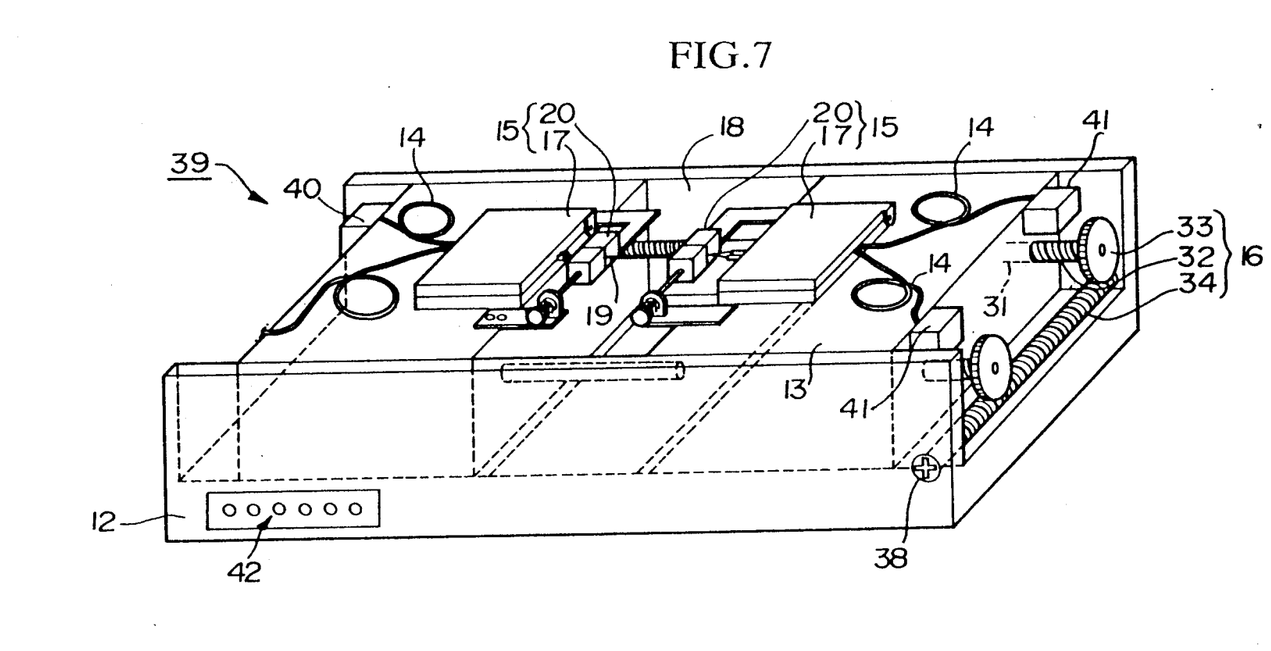
FIG. 7 is an oblique view of the optical fiber coupler manufacturing apparatus of a second preferred embodiment of the present invention.

In FIG. 7, an oblique view of the optical fiber coupler manufacturing device 39 of this second preferred embodiment is shown. Referring to the drawing, it can be seen that in addition to the features of the optical fiber coupler manufacturing apparatus 11 of the above described first preferred embodiment, the optical fiber coupler manufacturing apparatus 39 of the second embodiment further includes a semiconductor laser (hereafter referred to simply as light source) 40 provided on one of the movable stands 13, as well as two photoelectric converters 41 provided on the other movable stand 13. Furthermore, on one side of the optical fiber coupler manufacturing device 39 of the present embodiment, a plurality of terminals 42 are provided to which the output signals from photoelectric converters 41 are provided, and to which the electric power for light source 40 and photoelectric converters 41 is supplied.

The above mentioned light source 40 is connected with one end of one of the component optical fibers 14. The opposite end of both of the component optical fibers 14 each connect with a respective photoelectric converter 41, whereby the intensity of the output light from light source 40 may be measured both optical fibers 14, and by which means the coupling ratio may be determined.

As described above, with the optical fiber coupler manufacturing apparatus 39 as described above, a light beam from a semiconductor laser 40 is caused to be incident on one end of one of the component optical fibers 14, and the proportion of the incident light which reaches the opposite end of both the component optical fibers 14 is measured by a respective photoelectric converter 41, whereby the coupling ratio may be monitored over the course of the manufacturing process for the fused-elongated type optical fiber coupler in the same way that the coupling ratio was monitored with a separate light source 35 and light power meters 36 in the first preferred embodiment.

In addition to the improvements obtained with the optical fiber coupler manufacturing apparatus 11 of the first preferred embodiment, by including an integral light source 40 and photoelectric converters 41, the optical fiber coupler manufacturing apparatus 39 of the present embodiment provides a considerably simplified manufacturing system. Additionally, by including the light source 40 and photoelectric converters 41 mounted on the movable stands 13, the additional length of optical fibers 14 connecting the manufactured optical fiber coupler with the light source 40 and respective photoelectric converters 41 is considerably lessened, thus making the apparatus applicable to miniaturization.

Moreover, the optical fiber coupler manufacturing apparatus 39 of the present embodiment provides further simplicity and convenience by including the plurality of terminals 42 to which the light intensity output signals from photoelectric converters 41 are provided, and to which the power for light source 40 and photoelectric converters 41 is supplied. With such an arrangement, it becomes to employ a unitary cable in which all of the above mentioned signal and power input lines are contained, thus limiting the chance of misconnection, tangling and the like.

Third Preferred Embodiment

In the following section, a third preferred embodiment of the present invention will be described with reference to FIG. 8.

Figure 8:
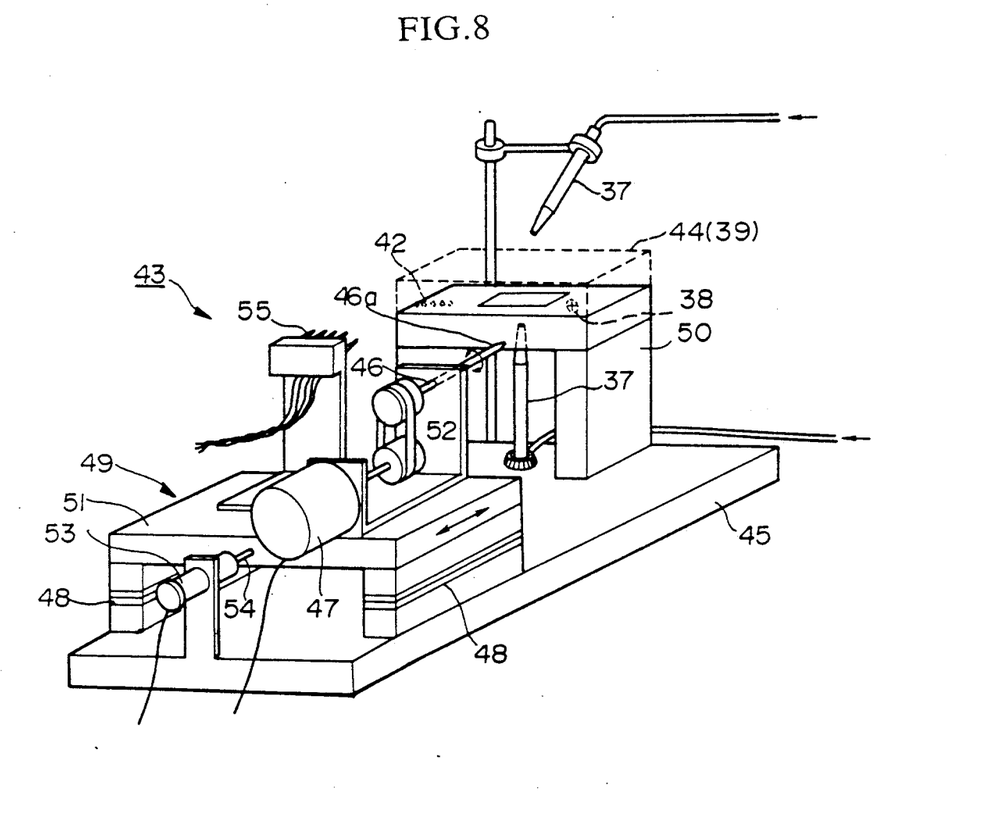
FIG. 8 is an oblique view of the optical fiber coupler manufacturing apparatus of a third preferred embodiment of the present invention.

In FIG. 8, an oblique view of the optical fiber coupler manufacturing device 43 of this third preferred embodiment is shown. The optical fiber coupler manufacturing device 43 of the present preferred embodiment includes either the optical fiber coupler manufacturing device 11 of the first preferred embodiment or the optical fiber coupler manufacturing device 39 of the second preferred embodiment as a manufacturing unit 44 mounted on a mounting base 45. Also included is a motor 47 which is connected with and drives the end 38 of screw shaft 34 of manufacturing unit 44 via a belt 52 which connects with one end of a drive shaft 46, the opposite driving end 46a of which connects with the above mentioned end 38 of screw shaft 34. On a pair of rails 48 provided on the upper surface of mounting base 45, a linearly movable driving apparatus 49 is provided. Further included is a pair of oxygen-hydrogen burners 37 whereby the exposed portions 19 of the two optical fibers 14 aligned side by side in the space 18 between the movable stands 13 of the manufacturing unit 44 are heated and mutually fused.

Included on the above mentioned mounting base 45 is a pair of stands 50 which elevate the above described manufacturing unit 44 so that so that the above mentioned oxygen-hydrogen burners 37 may be applied above and below the exposed portions 19 of the two optical fibers 14, and the above mentioned pair of rails 48 on which the driving apparatus 49 moves back and forth. The upper surface of the above mentioned stands 50 and the lower surface of manufacturing unit 44 join via a ridge provided on one of the two members and a groove provided on the other, whereby misalignment of the manufacturing unit 44 is prevented.

The above mentioned driving apparatus 49 includes a movable stage 51 linearly moveably mounted on the above mentioned rails 48, the above mentioned motor 47 mounted on movable stage 51, and the above mentioned belt whereby the rotary force of motor 47 is transmitted to drive shaft 46.

The piston rod 54 of an air cylinder 53 mounted on mounting base 45 is attached to the above mentioned movable stage 51, whereby the movable stage 51 can be driven back and forth on the rails 48. Over the range of motion of movable stage 51, the relative position of the above mentioned driving end 46a of drive shaft 46 and the end 38 of screw shaft 34 of manufacturing unit 44 vary so as to range from being separated by a fixed gap to a configuration where they are in contact and connected.

Also provided on the movable stage 51 is a plurality of pointed electrical connectors 55 mounted on a bracket in such a configuration that each individual connector of the plurality of electrical connectors 55 corresponds to one terminal of the plurality of terminals 42 provided on manufacturing unit 44. When movable stage 51 moves on rails 48 to the position where the driving end 46a of drive shaft 46 and the end 38 of screw shaft 34 of manufacturing unit 44 are connected, each connector of the plurality of electrical connectors 55 connects with its corresponding terminal of the plurality of terminals 42, whereby electrical power is supplied to light source 40 and the two photoelectric converters 41, and whereby the output of the two photoelectric converters 41 is connected to the appropriate output leads.

During operation of the optical fiber coupler manufacturing device 43 of the present preferred embodiment, two component optical fibers 14 are fixed in the movable stands 13 of manufacturing unit 44 which is secured on the pair of stands 50 which are in turn attached to the mounting base 45. While the oxygen-hydrogen burners 37 are applied to the exposed portions 19 of the two optical fibers 14 between the two movable stands 13, air cylinder 53 is activated causing movable stage 51 to move toward the position where the driving end 46a of drive shaft 46 and the end 38 of screw shaft 34 of manufacturing unit 44 are connected. Additionally, through the above described movement of movable stage 51, each connector of the plurality of electrical connectors 55 is brought into contact with its corresponding terminal of the plurality of terminals 42, whereby electrical power is supplied to light source 40 and the two photoelectric converters 41, and whereby the output of the two photoelectric converters 41 is connected to the appropriate output leads.

Next, motor 47 is activated, whereby the movable stands 13 are caused to move apart, thereby drawing out the fused, heated exposed portions 19 of the two optical fibers 14 between the two movable stands 13, while simultaneously, the coupling ratio of the optical fiber coupler being formed is monitored. When the desired coupling ratio is reached, motor 47 and hence the movement of movable stands 13 is stopped, after which through the action of air cylinder 53, movable stage 51 is caused to draw back, thus disconnecting the connectors 55 and terminals 42 and disengaging the driving end 46a of drive shaft 46 from the end 38 of screw shaft 34 of manufacturing unit 44.

Then, the fused-elongated region of the optical fiber coupler having thus been formed, the manufacturing unit 44 is removed from the stands 50 on mounting base 45 and another manufacturing unit 44 takes its place, whereby the optical fiber coupler manufacturing process can be repeated using the new manufacturing unit manufacturing unit 44 while at the same time, reinforcement plates, protective encasing, and similar auxiliary enhancements may be readily added through the central opening 18 between the two movable stands 13 is the previously used manufacturing unit 44.

With the optical fiber coupler manufacturing device 43 of this third preferred embodiment as described above, a driving apparatus 49 is employed to drive the movable stands 13 while heating the fused-elongated region formed from the exposed portions 19 of the two optical fibers 14 held therebetween with the oxygen-hydrogen burners 37. By controlling motor 47 of driving apparatus 49 based on the determined coupling ratio of the optical fiber coupler under formation, the movement of movable stands 13 and thus the drawing out of the fused, heated exposed portions 19 of the two optical fibers 14 can be automatically controlled to produce an optical fiber coupler having a desired coupling ratio. Further, by cycling two or more manufacturing units 44 on the mounting base 45 as described above, the output and efficiency of optical fiber coupler production can be considerably enhanced. Thus, the optical fiber coupler manufacturing device 43 of the present embodiment offers not only automation of a great part of the manufacturing cycle, but also a means to enhance the consistency and quality of the produced optical fiber couplers and improved manufacturing efficiency and output.

Manufacturing Example

Using the optical fiber coupler manufacturing device shown in FIG. 8, an fused-elongated type optical fiber coupler was manufactured as will be described in the following section.

Starting with two component quartz single mode optical fibers having a diameter of 125 μm, a mode field diameter of 9.5 μm, transmission losses of 0.4 dB/km, protective coating outer diameter of 0.4 mm, these fibers were mounted in the optical fiber coupler manufacturing device after the protective coating was removed from a portion of each. The exposed sections of the two component optical fiber were then aligned sided by side in the space between the two movable stands of the optical fiber coupler manufacturing device, after which they were heated from above and below using two oxygen-hydrogen burners. Then, laser light from the light source was caused to be incident on one end of one of the component optical fibers and the light intensity of the output signal was monitored from the opposite ends of both optical fibers. At the same time, the two movable stands clasping the pair of optical fibers were caused to move apart in small increments. At the point where the coupling ratio determined based on the output signal monitored from optical fibers reached 50%, the movement of the movable stands 13 was stopped, thus completing the manufacture of the optical fiber coupler. The optical fiber coupler thereby produced was found to have a coupling ratio of 49.8% and transmission losses of 0.08 dB, thus demonstrating high quality characteristics.

What is claimed is:

1. An optical fiber coupler manufacturing device comprising:
   a chassis;
   a pair of movable stands provided within said chassis;
   a light source attached to one of the pair of movable stands;
   a light intensity measuring device attached to the other of the pair of movable stands for each of at least two component fibers;
   an optical fiber mounting unit provided on each of said movable stands, whereby at least two component optical fibers can be mounted thereupon and aligned side by side;
   a heat application device for applying heat to a portion of said at least two component optical fibers mounted and aligned side by side in said optical fiber mounting units;
   a drive mechanism for driving said pair of movable stands back and forth in a direction parallel to the longitudinal axes of said at least two component optical fibers,
   whereby a portion of said at least two component optical fibers is aligned side by side, thereby forming an aligned section, after which said aligned section is thermally fused by said heat application device and drawn out through the action of said drive mechanism, thereby forming a fused-elongated type optical fiber coupler.

2. An optical fiber coupler manufacturing device in accordance with claim 1 above in which said drive mechanism which drives said pair of movable stands has at least two operating modes including a first operating mode in which said pair of movable stands are driven so as to move apart with respect one another, and a second operating mode in which said pair of movable stands are driven so as to approach one another.

3. An optical fiber coupler manufacturing device in accordance with claim 1 above in which said drive mechanism synchronously drives said pair of movable stands.

4. An optical fiber coupler manufacturing device in accordance with claim 1 above wherein the light source is provided at one end of one of said at least two component optical fibers whereby light is caused to be incident in said one end of one of said at least two component optical fibers, and wherein the light intensity measuring device for each of said at least two component optical fibers, by which means the light intensity is measured from each of said at least two component optical fibers is provided at the ends of said component optical fibers which are on the opposite side of the optical fiber coupler, whereby the coupling ratio of said optical fiber coupler which is formed is continuously determined.

5. An optical fiber coupler manufacturing device in accordance with claim 4 in which said light source is a semiconductor laser and each light intensity measuring device is an optical-electric conversion device.

6. An optical fiber coupler manufacturing device comprising:
   (a) at least one optical fiber coupler manufacturing unit including:
       a chassis;
       a pair of movable stands provided within said chassis,
       an optical fiber mounting unit provided on each of said movable stands, whereby at least two component optical fibers are mountable thereupon and aligned side by side, and
       a drive mechanism for driving said pair of movable stands back and forth in a direction parallel to the longitudinal axes of said at least two component optical fibers, said drive mechanism including a drive connection end for connecting said drive mechanism with a driving force for driving said pair of movable stands;
   (b) an optical fiber coupler manufacturing unit mounting base for releasably mounting one of said optical fiber coupler manufacturing units thereon;
   (c) a driving apparatus including a drive force source which is connectable and disconnectable with said drive connection end of said drive mechanism of said optical fiber coupler manufacturing unit when said optical fiber coupler manufacturing unit is mounted on said optical fiber coupler manufacturing unit mounting base, said driving apparatus linearly being slidably mounted on said optical fiber coupler manufacturing unit mounting base so as to be freely movable between a position in which said drive force source is connected with said drive connection end of said drive mechanism, and a position in which said drive force source is disconnected with said drive connection end of said drive mechanism;
   (d) a heat application device for applying heat to a portion of said at least two component optical fibers mounted and aligned side by side in one of said optical fiber counting units when said optical fiber coupler manufacturing unit is mounted on said optical fiber coupler manufacturing unit mounting base;
whereby in each of said at least one optical fiber coupler manufacturing units, a portion of said at least two component optical fibers is aligned side by side thereby forming an aligned section, after which said aligned section is thermally fused by said heat application device and drawn out through the action of said drive mechanism, thereby forming a fused-elongated type optical fiber coupler.

7. An optical coupler manufacturing device in accordance with claim 6 above in which said drive mechanism which drives said pair of movable stands has at least two operating modes including a first operating mode in which said pair of movable stands are driven so as to move apart with respect to one another, and a second operating mode in which said pair of movable stands are driven so as to approach one another.

8. An optical fiber coupler manufacturing device in accordance with claim 6 above in which said drive mechanism synchronously drives said pair of movable stands.

9. An optical fiber coupler manufacturing device in accordance with claim 6 above further comprising a light source provided at one end of one of said at least two component optical fibers whereby light is caused to be incident in said one end of one of said at least two component optical fibers, and further comprising one light intensity measuring device for each of said at least two component optical fibers, by which means the light intensity is measured from each of said at least two component optical fibers at the ends of said component optical fibers which are on the opposite side of the optical fiber coupler formed with respect to said end at which said light source is provided, whereby the coupling ratio of said optical fiber coupler is continuously determined.

10. An optical fiber coupler manufacturing device in accordance with claim 9 in which said light source is attached to one movable stand of said pair of movable stands and each light intensity measuring device for each of said at least two component optical fibers is mounted to the other movable stand of said pair of movable stands.

11. An optical fiber coupler manufacturing device in accordance with claim 9 in which said light source is a semiconductor laser and each light intensity measuring device for each of said at least two component optical fibers is an optical-electric conversion device.

12. An optical fiber coupler manufacturing unit including:
a chassis;
a pair of movable stands provided within said chassis;
an optical fiber mounting unit provided on each of said movable stands for mounting at least two component optical fibers thereupon and aligned side by side;
a light source provided at one end of one of said at least two component optical fibers whereby light is caused to be incident in said one end of one of said at least two component optical fibers, said light source attached to the movable stand of said pair of movable stands which is most proximal to said one end of one of said at least two component optical fibers at which said light source is incident;
one light intensity measuring device for each of said at least two component optical fibers for measuring the light intensity for each of said at least two component optical fibers at the ends of said component optical fibers which are on the opposite side of the optical fiber coupler, said light intensity measuring device for each of said at least two component optical fibers being mounted to the movable stand opposite the movable stand to which said light source is attached to continuously determine the coupling ratio of said optical fiber coupler;
a plurality of electrical terminals provided on an external aspect of said optical fiber coupler manufacturing unit for inputting the electric power to said light source and said one light intensity measuring device for each of said at least two component optical fibers and for outputting the output signal for each of said one light intensity measuring device for each of said at least two component optical fibers; and
a drive mechanism for driving said pair of movable stands back and forth in a direction parallel to the longitudinal axes of said at least two component optical fibers, and
an external heat application device for thermally fusing a portion of said at least two component optical fibers aligned side by side and forming an aligned section, and wherein the fused portion is drawn out through the action of said drive mechanism while the coupling ratio of said optical fiber coupler under formation is continuously determined, thereby forming a fused-elongated type optical fiber coupler.

13. An optical fiber coupler manufacturing device in accordance with claim 12 in which said drive mechanism which drives said pair of movable stands has at least two operating modes including a first operating mode in which said pair of movable stands are driven so as to move apart with respect to one another, and a second operating mode in which said pair of movable stands are driven so as to approach one another.

14. An optical fiber coupler manufacturing device in accordance with claim 12 in which said drive mechanism synchronously drives said pair of movable stands.

15. An optical fiber coupler manufacturing device in accordance with claim 12 in which said light source is a semiconductor laser and each of said one light intensity measuring device for each of said at least two component optical fibers is an optical-electric conversion device.

16. An optical fiber coupler manufacturing unit including:
(a) An optical fiber coupler manufacturing unit including:
a chassis;
a pair of movable stands provided within said chassis;
an optical fiber mounting unit provided on each of said movable stands for mounting at least two component optical fibers thereupon and aligned side by side;
a light source provided at one end of one of said at least two component optical fibers whereby light is caused to be incident in said one end of one of said at lest two component optical fibers, said light source attached to the movable stand of said pair of movable stands which is most proximal to said one end of one of said at least two component optical fibers at which said light source is incident;
one light intensity measuring device for each of said at least two component optical fibers for measuring the light intensity for each of said at least two component optical fibers at the ends of said component optical fibers which are on the opposite said of the optical fiber coupler formed with respect to said end at which said light source is provided, said light intensity measuring device for each of said at least two component optical fibers being mounted to the movable stand opposite the movable stand to which said light source is attached to continuously determine the coupling ratio of said optical fiber coupler;

a plurality of electrical terminals provided on an external aspect of said optical fiber coupler manufacturing unit for inputting the electric power to said light source and said one light intensity measuring device for each of said at least two component optical fibers and outputting the output signal for each of said one light intensity measuring device for each of said at least two component optical fibers; and a drive mechanism for driving said pair of movable stands back and forth in a direction parallel to the longitudinal axes of said at least two component optical fibers, (b) an optical fiber coupler manufacturing unit mounting base for releasably mounting one of said optical fiber coupler manufacturing units thereon;

(c) a driving apparatus including a drive force source which is connectable and disconnectable with said drive connection end of said drive mechanism of said optical fiber coupler manufacturing unit when said optical fiber coupler manufacturing unit is mounted on said optical fiber coupler manufacturing unit mounting base, and further including a plurality of electrical terminals which are electrically connectable and disconnectable with corresponding electrical terminals among said plurality of electrical terminals provided on said optical fiber coupler manufacturing unit for connecting electrical power with said light source and said light intensity measuring devices and the output signals from said light intensity measuring devices with a device for monitoring said output signals, said driving apparatus linearly slidably mounted on said optical fiber coupler manufacturing unit mounting base so as to be freely movable between a position in which said drive force source is connected with said drive connection end of said drive mechanism and in which position said electrical terminals on said driving apparatus are electrically connected with corresponding electrical terminals among said plurality of electrical terminals provided on said optical fiber coupler manufacturing unit, and a position in which said drive force source is disconnected with said drive connection end of said drive mechanism and in which position said electrical terminals on said driving apparatus are electrically disconnected from said electrical terminals provided on said optical fiber coupler manufacturing unit; and (d) a heat application device for applying heat to a portion of said at least two component optical fibers mounted and aligned side by side in one of said optical fiber counting units when said optical fiber coupler manufacturing unit is mounted on said optical fiber coupler manufacturing unit mounting base;

whereby in each of said at least one optical fiber coupler manufacturing units, a portion of said at least two component optical fibers is aligned side by side thereby forming an aligned section, after which said aligned section is thermally fused by said heat application device and drawn out through the action of said drive mechanism while the coupling ratio of said optical fiber coupler under formation is continuously determined, thereby forming a fused-elongated type optical fiber coupler.

17. An optical fiber coupler manufacturing device in accordance with claim 16 in which said drive mechanism which drives said pair of movable stands has at least two operating modes including a first operating mode in which said pair of movable stands are driven so as to move apart with respect to one another, and a second operating mode in which said pair of movable stands are driven so as to approach one another.

18. An optical fiber coupler, manufacturing device in accordance with claim 16 which said light source is a semiconductor laser and each of said one light intensity measuring device for each of said at least two component optical fibers is an optical electric conversion device.

* * * * *